Nov. 4, 1924.  
W. N. METCALF  
1,514,329  
VENTILATING SYSTEM FOR VEHICLES  
Filed July 26, 1923   2 Sheets-Sheet 1
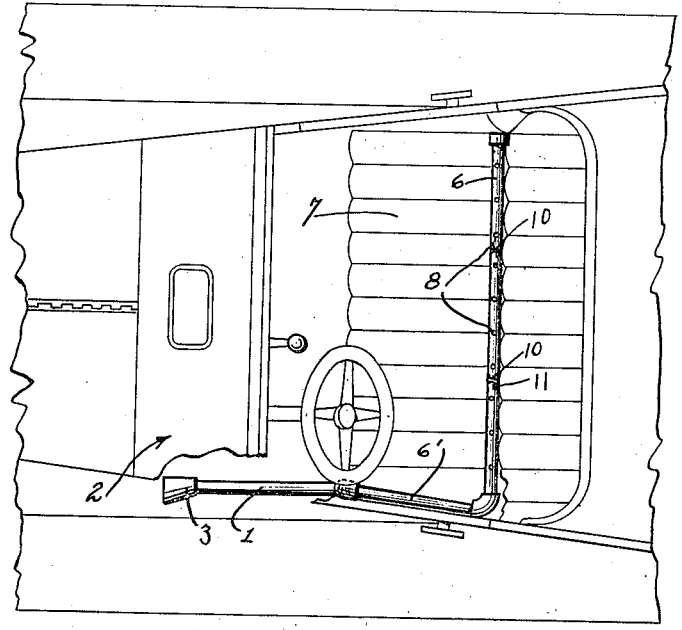
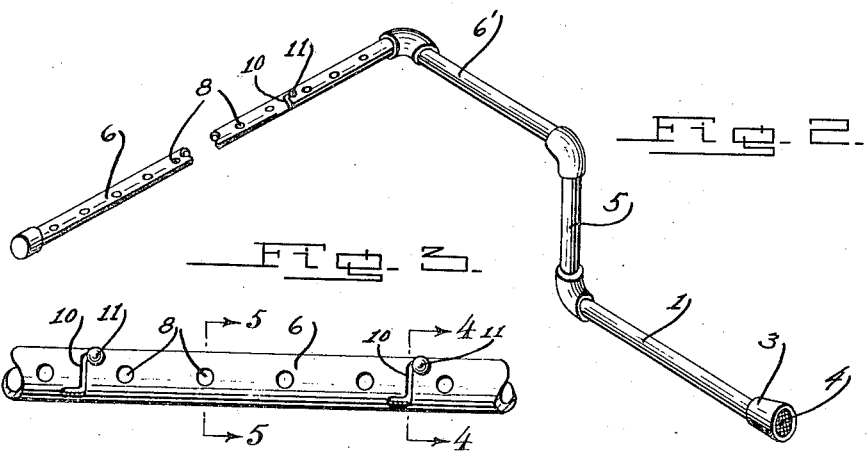
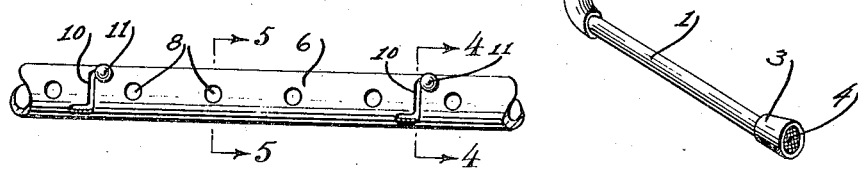
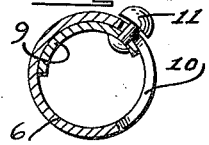 
Inventor  
Walter N. Metcalf  
By Jacobi & Jacobi  
Attorneys

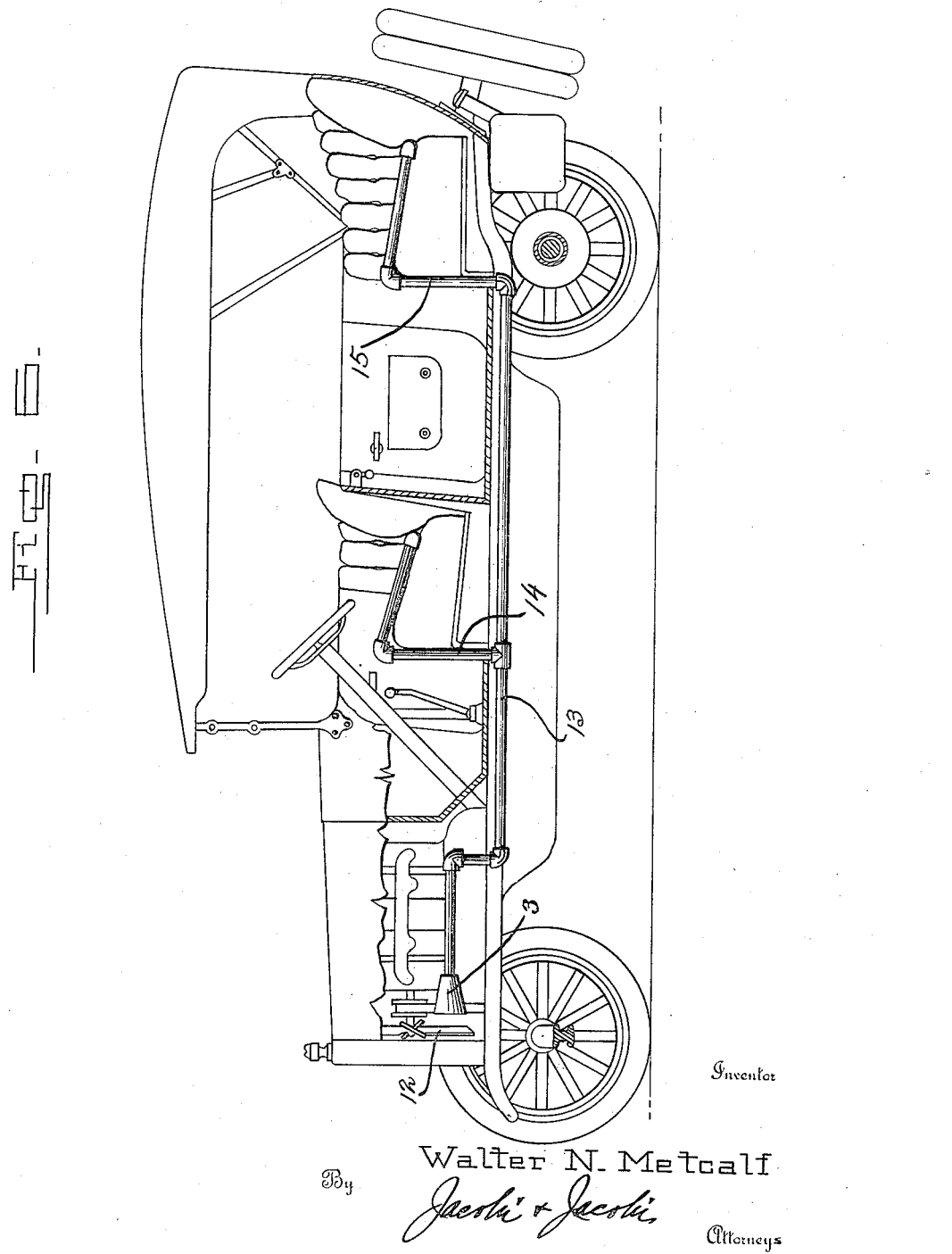

Patented Nov. 4, 1924.

1,514,329

UNITED STATES PATENT OFFICE.

WALTER N. METCALF, OF EVENING SHADE, ARKANSAS.

VENTILATING SYSTEM FOR VEHICLES.

Application filed July 26, 1923. Serial No. 654,041.

*To all whom it may concern:*

Be it known that WALTER N. METCALF, a citizen of the United States, residing at Evening Shade, in the county of Sharp and State of Arkansas, has invented certain new and useful Improvements in Ventilating Systems for Vehicles, of which the following is a specification.

This invention relates to a ventilating system for motor vehicles particularly automobiles and has for its principal object to provide a device whereby the person or persons seated in said automobile may receive the benefit from the ventilating system and thereby provide for the comfort of the occupants of the automobile.

Another object of the invention is to provide a ventilating system of the above mentioned character, which is entirely automatic in its operation and will insure the proper circulation of air at the back of the seat of the vehicle when the same is in motion.

A still further object of the invention is to provide a ventilating system for a motor vehicle which is provided with means whereby the circulation of air may be cut off when the vehicle is operated in cold weather and it is not necessary to circulate cold air within the interior of the car when the same is in motion.

A still further object of the invention is to provide a ventilating system of the above mentioned character, which may be easily and cheaply installed on any kind of motor vehicle without considerable difficulty or expense.

Another important object of the invention is to provide a ventilating system for motor vehicles of the above mentioned character, which is simple in construction, inexpensive, strong, durable and further well adapted for the purposes for which it is designated.

Other objects and advantages of the invention will become apparent during the course of the following description.

In the accompanying drawings forming a part of this specification and in which like numerals designate like parts throughout the same:—

Figure 1 is a top plan view showing the manner and relation in which my ventilating system is mounted upon an automobile.

Figure 2 is a perspective view.

Figure 3 is a fragmentary front elevation of the transverse pipe.

Figure 4 is a vertical section taken on line 4—4 of Fig. 3, showing the manner in which the sliding plate is associated therewith, the sliding plate being out of engagement with the apertures in the transverse pipe.

Figure 5 is a vertical section taken on line 5—5 of Fig. 3 showing the sliding plate in a closed position.

Figure 6 is a modification showing the ventilation system in side elevation.

In the drawings wherein for the purpose of illustration is shown the preferred embodiment of my invention, the numeral 1 designates an air circulating pipe which extends horizontally through the body of the vehicle and has its forward end extending outwardly from the body 2 so as to provide an enlarged inlet 3 for the purpose of receiving a supply of fresh air to the interior of the car, for the purpose to be hereinafter more fully described. This enlarged inlet 3 extends from the interior of the car and preferably adjacent the hood thereof and is provided with a detachable screened cap 4 for the purpose of preventing any foreign substance from entering the horizontally air circulating pipe 1 and thereby preventing the free circulation of cool air therethrough.

The opposite end of the horizontally extending air circulating pipe 1 communicates with the short section of vertical piping 5 and the upper end of which is adapted to be connected to a transversely extending pipe 6 and this connection is formed through the medium of a section of piping 6′ which communicates with the horizontally extending air circulating pipe 1 and is secured by means of suitable elbows and through the transverse pipe 6 and the vertically extending pipe 5 in the manner as more clearly shown in Fig. 2 of the drawings. The transversely extending pipe 6 is so arranged as to extend longitudinally at the top of the back of the seat 7 in the vehicle as more clearly shown in Fig. 1 of the drawings and this transverse extending pipe 6 is provided with a series of spaced apertures 8. These apertures 8 are so arranged in the transverse pipe 6 as to be in direct communication with the top of the seat 7 for the purpose to be hereinafter more fully described.

Slidably mounted in the transverse pipe 6 and carried upon the interior thereof and preferably adjacent the apertures 8 formed in the transverse pipe 6 is a curved plate 9. This plate 9 is adapted to extend longitudinally within the transverse pipe 6 and fits snugly against the inner walls of the pipe for the purpose of cooperating with the apertures 8 formed therein.

A number of slots 10 are provided in the transverse pipe 6 and are arranged transversely in the apertures 8 formed therein and are preferably of the bayonet type. The bayonet slots 10 are furthermore provided in the transverse pipe 6 at the central portion thereof. The sliding plate 9 is provided with a pair of operating handles 11 which are adapted to extend through the bayonet slots 10 formed in the transverse pipe 6 and are furthermore adapted to operate in the bayonet slots so as to move the plate 9 transversely in the transverse pipe 6 for the purpose of holding the plate 9 in a closed position over the apertures 8 formed in the pipe or upon movement of the handles 11 to the top of the bayonet slots 10 the plate 9 will be brought out of engagement with the apertures 8 and will be furthermore prevented from accidentally covering the apertures when it is desired to allow the fresh air to circulate through the pipe 1 to enter the transverse pipe 6 and escape through the apertures 8 formed therein.

In warm weather it is customary and usually the experience of the driver of the automobile to become uncomfortable and warm while driving the same due to the fact that the person operating the vehicle is so seated upon the seat of the vehicle that he cannot very easily move about and thereby is caused to stay in one position all of the time that he is driving. This makes it very uncomfortable for the driver and furthermore there is no means provided whereby a sufficient circulation of air will be received by the driver at the back of the seat to aid in providing comfort to him.

With a ventilating system of the above mentioned character, it can be well appreciated how the circulation of air will be caused to enter the enlarged inlet opening 3 and pass through the horizontally air circulating pipe 1 into the transverse pipe 6 when the air is permitted to escape through the apertures 8 so as to permit the circulation of air at the back of the seat 2 and around the back of the person operating the vehicle thereby permitting a thorough circulation of fresh air whereby the operator receives the benefits therefrom.

When operating a motor vehicle in cold weather it is not desired to permit cool air passing through the pipe to enter the back of the seat and for the purpose of preventing the admittance of cool air to the back of the person operating the vehicle, I have provided a sliding plate in the transverse pipe 6 which will close all of the apertures 8 when the same is lowered and thereby prevent the admittance of cool air to the back of the seat and to the interior of the car.

In Fig. 6 of the drawings I have shown a modification wherein my ventilating system is adapted to be associated with a motor vehicle which is provided with front and rear seats and the air is obtained through the medium of the cooling fan at the front of the car. In the construction as shown in Fig. 6, of the drawings, the air enters the enlarged inlet 3 and this enlarged inlet 3 is preferably positioned directly behind the cooling fan 12 so that while the motor vehicle is in operation, the fan will cause a certain amount of air to be directed backwardly and into the enlarged inlet 3 and there the air passes through the horizontally extending pipe 13 which is preferably positioned beneath the floor of the car and this pipe 13 extends longitudinally of the car and has the vertical pipes 14 and 15 respectively in communication therewith.

The vertical pipe 14 is adapted to extend upwardly from the horizontal pipe 13 so as to direct the cool air to the back of the front seat while the vertically extending pipe 15 is preferably in communication with the rear end of the horizontally extending air circulating pipe 13 so as to permit a quantity of cool air to enter the back seat of the vehicle. As the construction of the circulating pipes at the seat are the same as heretofore described, it is not thought necessary to further go in detail as to the same, it being sufficient to state that each pipe 14 and 15 is connected to the transversely extending pipe which permits the air to escape at the rear of the seat is so located as to not interfere with the seating of the occupants in the vehicle.

With a ventilating system of the above mentioned character, the simplicity of the same renders it very efficient in its operation and furthermore does not necessitate the employment of a number of parts or the alteration of the vehicle in any form. Furthermore various kinds of vehicles may be supplied with a simple ventilating system of the above mentioned character, and the advantages of the same will be greatly appreciated and will furthermore add to the comfort of the occupants of the car especially during the warm weather.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

In combination with a motor vehicle and a seat therein, of an air circulating pipe extending horizontally in the body of said vehicle, the inlet of said air pipe extending outwardly from the body of said vehicle, a screen for the said inlet end of said circulating pipe, a transverse pipe associated with the opposite end of said air circulating pipe, said transverse pipe extending longitudinally at the back of said seat, said transverse pipe provided with a series of apertures for the purpose of admitting cool air at the back of said seat, and a plate slidably mounted in said transverse pipe and adapted to cover said apertures, said slidable plate adapted to move longitudinally and vertically guided by slots formed in said transverse pipe adjacent said apertures.

In testimony whereof I affix my signature.

WALTER N. METCALF.